(12) United States Patent
Frabasile (10) Patent No.: US 8,179,261 B2
(45) Date of Patent: May 15, 2012

(54) IDENTIFICATION AND SURVEILLANCE DEVICE, SYSTEM AND METHOD FOR INDIVIDUAL ITEM LEVEL TRACKING

(75) Inventor: Giovanni Frabasile, Dollard des Ormeaux (CA)

(73) Assignee: AbsoluteSKY Holdings, Inc., Montréal, Québec (CA)

( * ) Notice: Subject to any disclaimer, the term of this patent is extended or adjusted under 35 U.S.C. 154(b) by 633 days.

(21) Appl. No.: 12/305,354

(22) PCT Filed: Jun. 20, 2007

(86) PCT No.: PCT/CA2007/001104
§ 371 (c)(1),
(2), (4) Date: Dec. 17, 2008

(87) PCT Pub. No.: WO2007/147250
PCT Pub. Date: Dec. 27, 2007

(65) Prior Publication Data
US 2010/0060455 A1 Mar. 11, 2010

Related U.S. Application Data

(60) Provisional application No. 60/814,886, filed on Jun. 20, 2006.

(51) Int. Cl.
*G08B 13/14* (2006.01)
(52) U.S. Cl. .................. 340/572.4; 340/572.1; 340/5.92
(58) Field of Classification Search .... 340/572.1–572.9, 340/5.92; 235/493, 494, 385
See application file for complete search history.

(56) References Cited

U.S. PATENT DOCUMENTS

| | | | |
|---|---|---|---|
| 5,995,951 A | 11/1999 | Ferguson | |
| 6,019,394 A | 2/2000 | Chenoweth et al. | |
| 6,747,560 B2 | 6/2004 | Stevens, III | |
| 6,883,710 B2 | 4/2005 | Chung | |
| 6,952,680 B1 | 10/2005 | Melby et al. | |
| 6,961,709 B2 | 11/2005 | Goodwin, III | |
| 7,176,784 B2 * | 2/2007 | Gilbert et al. | 340/10.34 |
| 2003/0209601 A1 * | 11/2003 | Chung | 235/385 |
| 2004/0181528 A1 * | 9/2004 | Tirinato et al. | 707/8 |
| 2004/0217864 A1 | 11/2004 | Nowak et al. | |
| 2004/0233042 A1 | 11/2004 | Piccoli et al. | |
| 2005/0040950 A1 * | 2/2005 | Clucas | 340/572.1 |
| 2005/0149414 A1 | 7/2005 | Schrodt et al. | |
| 2005/0258956 A1 | 11/2005 | Neuwirth | |
| 2005/0270159 A1 | 12/2005 | Brady et al. | |
| 2006/0032915 A1 * | 2/2006 | Schwartz | 235/383 |
| 2006/0109109 A1 * | 5/2006 | Rajapakse et al. | 340/539.13 |
| 2007/0080804 A1 * | 4/2007 | Hirahara et al. | 340/572.1 |
| 2007/0139199 A1 * | 6/2007 | Hanlon | 340/572.1 |

* cited by examiner

*Primary Examiner* — Anh V La
(74) *Attorney, Agent, or Firm* — Knobbe Martens Olson & Bear LLP (57) ABSTRACT

There are provided an identification and surveillance device, a system and a method using active RFID technology to accurately and automatically track inventory at the item-level across the supply chain in real-time and at a distance. The device is provided with an attaching device for attaching to the item and a radio-frequency device securely mounted with the attaching device. The radio-frequency device comprises storage for storing data therein, the data comprising individual tag-related information, a transmitter, an antenna and a power source for powering the device. The radio-frequency device, with the help of the transmitter, is able to communicate with a corresponding radio-frequency receiver for tracking the item.

25 Claims, 7 Drawing Sheets

IDENTIFICATION AND SURVEILLANCE DEVICE, SYSTEM AND METHOD FOR INDIVIDUAL ITEM LEVEL TRACKING

FIELD OF THE INVENTION

The present invention generally relates to the field of identification and surveillance of different types of inventory items, such as retail items in the retail industry for example. It more particularly concerns a radio-frequency identification and surveillance device attachable to an inventory item for tracking the item in real time. It also concerns a system and a method using such identification and surveillance devices for independently tracking a plurality of inventory items.

BACKGROUND OF THE INVENTION

Known in the art, there are Radio Frequency (RF) systems that can advantageously be used for inventory identification purposes. In this case, such RF systems are generally known as Radio Frequency Identification (RFID) systems. RFID is a wireless data collection technology that uses electronic tags for storing data. In the retail industry for example, RFID tags are recognised as a "smart" replacement for bar codes, providing a means to attach identifying information, in the form of electronic data, to a product. RFID tag data capacity is big enough that the tags can have unique individual codes, while current bar codes are limited to a single type code for all instances of a particular product. The uniqueness of RFID tags means that a product may be automatically individually identified as it moves from location to location, finally ending up in the consumer's hands.

Retail systems based on RFID technology have two main values for inventory systems. First, the visibility provided by this technology allows an accurate knowledge on the inventory level by eliminating the discrepancy between inventory record and physical inventory. Second, the RFID technology can prevent or reduce the sources of errors, including misplacement and transaction errors within an inventory system. As such, RFID technologies are desired by retailers to potentially help increase sales, lower labour costs, automate physical inventory counts, improve stockroom logistics and provide efficiencies across the complete retail supply chain.

Paper-thin passive RFID tags can be hidden on inventory or embedded into the packaging. They are also subject to source tagging—the process of embedding RFID circuits into the inventory item or its packaging by the manufacturer.

Unlike bar codes, which must be brought very close to, and within line-of-sight of, a scanner for reading, RFID tags are read when they are within a non-line of sight range of a transmitted radio signal. For low-cost "passive" RFID tags used in retail products, this generally implies a range of a few feet or less to achieve acceptable read rates.

By definition, passive tags require an interrogating signal in order to respond with a transmitted identification code, the limitation being the distance between the tag and the RFID readers. Also, in order for a passive tag to respond to the interrogating signal, the RFID reader must be almost parallel to the tag, otherwise the tag will not be able to respond to the reader. The fact that they can be individually read only when scanned presents an inherent limitation that prevents tags from being individually read in real time, or individually read amongst a plurality of tags in real time. It therefore follows that, because the individually tagged inventory items cannot be read in real time, they cannot be individually identified or tracked in real time, thus dramatically limiting their direct use for this purpose.

Passive RFID tags are also generally designed to be disposed of and not reused after purchase, also normally necessitating that their cost be added to the cost of the item being sold. The practice of leaving the tags on the item beyond the point of sale has also generated concern and protests by some consumer rights groups on the basis that they may ostensibly be used for involuntary, unauthorized tracking of items post-purchase.

For these and a range of technical issues, passive RFID tags have been largely unsuitable for so-called "item-level tracking" in the retail industry. They have been attached at the item-level with limitation for specific uses on shelving systems and grocery carts but not for real-time item-level tracking. They are also being used to track crates, boxes and cartons in some retail applications, where positioning of the tags and movement of packaging is highly controlled, but are not used to individually track the inventory items within them.

Active RFID tags, because they incorporate their own power source and transmitters, which adds cost to the tags, have been hitherto considered too expensive to find practical use in the retail industry. They, however, do provide performance at much greater ranges than passive tags, as well as offering other technical advantages.

Also known in the art, in order to perform surveillance of different items such as retail items, there are Closed Circuit Televisions (CCTVs) and tag-and-alarm systems, better known as Electronic Article Surveillance (EAS) systems. EAS is a technology used to provide an anti-theft alarm as tagged items pass through a highly defined gated area in a store. This alarm is used to alert store personnel that unauthorized removal of items through a specific exit is being attempted. It is noted that EAS systems, as anti-theft systems for exit points, are explicitly not inventory tracking or identification systems.

Today, several types of EAS systems dominate the retail industry. The retailer generally has the option of choosing either Electromagnetic (EM) technology or Radio Frequency (RF) technology, or the combination of EM and RF together. In each case, an EAS tag or label is attached to an inventory item. If the tag is a hard, reusable tag, a detacher is used to remove it when a customer purchases the item it is attached to. If it is a disposable paper tag, in some cases it can be deactivated by swiping it over a pad. If the item has not been deactivated or detached, when it is carried through the gates, the EAS tag triggers an alarm.

It is noted that an EAS system generally reports the unauthorized removal of an inventory item, but does not in itself provide any item-specific inventory information, such as the item's specific identity, or other information related to its removal from inventory. Nor does the system track, report or automatically change the item's inventory status. If the unauthorized removal of the item is not detected by the EAS system, the retailer will not know if the item has left inventory until the next physical inventory count is conducted. Until that time, the retailer does not have reliable information on what is in inventory or not.

Further, EAS systems do not completely eliminate theft due to shoplifting. Shoplifters have found various means to remove EAS tags, interfere with or block EM/RF signals or take advantage of the confusion or employee apathy related to reacting to false alarms. As they evolve they have become more difficult to remove and some features such as "benefit denial" (spillage of ink, for example, if tampered with) have been developed. For these reasons, EAS systems are in broad store-level use for security purposes today because they at least address part of the consumer theft problem (at exit points) and act as a visible deterrent to shoplifters.

Importantly, EAS systems, in fact, do not address the problem of "inventory shrinkage" in broader scope i.e. losses resulting not only from shoplifting, but also those due to employee theft, fraud, spoilage/spillage of stock, or from accounting or inventory counting errors. Generally, losses related to shoplifting account for roughly only 30-40% of overall shrinkage in retail. As such, being focussed almost solely on the shoplifter (and exit points only) component of inventory shrinkage, EAS systems in themselves do not provide a Loss Prevention solution for retailers i.e. reducing the amount of total theft and shrinkage within a business. Loss Prevention therefore continues as an ongoing and very serious imperative for retailers.

For example, known in the art, there is US patent application No. 2005/0258956 which describes a RF identification asset management system and method. The method involves the placing of a RFID tag on a reusable asset, such as a keg or hospital equipment, for tracking and managing such an asset. However, the system described in this patent application, which is not retail-specific, does not provide anti-theft capability. Moreover, such a system does not provide a real-time tracking of the assets.

Also known in the art, there are U.S. Pat. Nos. 6,747,560; 6,952,680; 6,961,709; 6,019,394; 5,995,951 and US patent applications Nos. 2005/0149414; 2005/0258956; 2004/0233042; 2005/0270159, which disclose different RF systems for tracking an asset.

Even if some of the above described methods and systems provide good solutions for "asset management" and yet others for preventing theft, several issues still remain that prevent them from being used for identifying and tracking inventory items. Indeed, none of the above-mentioned patents or patent applications provides a real-time, individual item-level inventory identification and tracking system particularly adapted for the retail industry while providing Loss Prevention, i.e. addressing the broad retail shrinkage issue in totality. Moreover, most of the solutions mentioned above have to be used in highly controlled "cooperative" environments and are thus not well adapted for individual item-level identification and tracking across the complete retail supply chain, including the storefront, which are largely "uncooperative environments".

Therefore, it would be desirable to provide a system and a method for tracking and managing inventory at the individual item-level in real time while being particularly adapted for the retail industry, and for use in less controllable "uncooperative" environments (such as store-level operations) as well as cooperative environments. Moreover, it would be even more desirable to provide an identification and surveillance device which is reusable in order to lower the costs associated with the use of such an identification and surveillance device.

SUMMARY OF THE INVENTION

An object of the present invention is to provide an identification and surveillance device attachable to an individual inventory item for tracking thereof that overcomes several of the above-mentioned drawbacks.

Accordingly, the present invention provides an identification and surveillance device attachable to an individual item for individually tracking the item. The device is provided with an attaching device for attaching to the item and a radio-frequency device securely mounted with, or within, the attaching device. The radio-frequency device is provided with a storing means for storing data therein, the data comprising individual tag-related information. The radio-frequency device is also provided with a transmitter, an antenna and a power source for powering the device. The radio-frequency device, with the help of the transmitter, is able to communicate with a corresponding radio-frequency receiver or reader for tracking the item.

In a further embodiment, the identification and surveillance device may advantageously be provided with both an active chip and a passive chip, and in some cases, operating in a dual-frequency mode or, multiple varying transmitting intervals or phases.

According to another aspect of the invention, there is also provided an identification and surveillance system for independently tracking a plurality of individual items. The system has a plurality of identification and surveillance devices as described above, each being attachable to a respective one of the plurality of items. The system is also provided with a radio-frequency receiver or reader capable of communicating with each of the radio-frequency devices for receiving each of the corresponding data. The system also comprises a software product suite including application software, loaded into a host computer or server, and adapted to read, process and store each of the data with the help of the radio-frequency receiver for tracking each of the corresponding items.

Preferably, the system also has an Application Programming Interface (API) to enable the seamless integration with, or interfacing to, other software and hardware applications consistent with retail operating environments and retailer enterprise systems.

According to another aspect of the invention, there is also provided an identification and surveillance method for independently tracking a plurality of individual inventory items. The method comprises the steps of:

a) providing a plurality of identification and surveillance devices as previously described;
b) attaching each of the identification and surveillance devices to a respective one of the inventory items;
c) providing a software product suite with application software loaded into a host computer and adapted to read, process and store each of the data with the help of a radio-frequency receiver or reader for tracking each of the corresponding items; and
d) tracking each of the items.

In a preferred embodiment, the device and system of the present invention are particularly adapted to be used in the retail industry.

Advantageously, the identification and surveillance device of the present invention relies on the use of an active RFID chip, i.e. provided with an internal power supply, for allowing a real-time tracking of the items, thereby providing an improved surveillance thereof.

Moreover, the proposed identification and surveillance device is particularly advantageous since it can be reused several times, thereby dramatically cutting down the costs associated with the use of an active chip.

Furthermore, as it will be more clearly understood upon reading the following detailed description of preferred embodiments of the present invention, the device and system of the present invention advantageously provide the following non-exhaustive capabilities for retail:

Instantaneous physical inventory count;
Automated store receiving;
Item location;
Direct store-to-store transfer control;
Automated markdown counts;
Control over styles and style aging;
Control of layaway, display and damaged inventory;

Fitting room loss prevention and accessory video suggestion service;
Customer loyalty programs;
Integration with the point of sale;
Integration with automated checkout systems;
Creation of multiple unique zones with retail operations;
Warehouse receiving and shipping;
Enterprise integration;
Remote system access via internet, kiosks or mobile appliances;
Loss prevention (LP);
Tag tamper detection and alerts, including item identification and time-stamp;
Integration with Digital Video Recorders (DVRs);
Incident capture, reporting, triggers and alerts;
Integration with global positioning system (GPS);
Interfacing or integration with EAS systems;
Motion detection;
Detection of operating conditions such as temperature;
Point of Sale (POS) Security;
Kiosks;
Portable readers;
Laptop and PC Security.

In a further embodiment of the present invention, the device and system can be used to track employees, enable specifically authorized employee use of the point-of-sale system, match employee identification through time-stamps and video images to incident alerts, or be integrated with time and attendance software.

BRIEF DESCRIPTION OF THE DRAWINGS

These and other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the present description and the appended claims.

DESCRIPTION OF THE PREFERRED EMBODIMENTS

In the following description, the various aspects of the present invention will be particularly described in the retail industry environment but it should be understood that the various embodiments provided in the present invention can also be used in other application fields requiring identification and/or surveillance of any convenient element, such as a retail item or a vehicle for example, as well as people if needed.

The retail industry has long sought a technological solution that could slice the time it takes to measure inventory, provide accurate information about a single inventory item as it moves through the supply chain, and ultimately transform the "supply chain" into a "demand chain", i.e. putting the right item, in the right place, at the right time, and at the right price.

Retail supply chain management itself is a difficult maze that encompasses the moving of goods from the manufacturer to the Point-of-Sale (POS), while minimizing inventory levels and warehousing and transportation costs. Retailers must walk the thin line of having enough inventories to avoid stock outs, while keeping inventories low enough to minimize carrying costs and being able to respond to ever-changing consumer demands.

The present invention therefore provides an affordable solution that can accurately and automatically track inventory at the item-level across the supply chain in real-time and at a distance.

Contrary to the prior RF passive devices presently used, the present invention advantageously utilizes an active chip embedded in the radio-frequency (RF) device or inventory tag. Active inventory tags incorporate a battery to transmit a signal to a reader via antennae. These tags either emit a signal at a predefined interval or transmit when addressed by a reader. Active tags are more advantageous than the passive devices used in the art since they can transmit using their own power across much larger distances and report automatically in real-time without requiring an interrogation signal from a reader. They also have significantly higher storing and processing capabilities than magnetic strips or passive tags. Moreover, in the present invention, active tags are used at specific frequencies, preferably in a frequency range comprised between Low Frequency and Micro Frequency, in the approved radio spectrum frequency allocations, and more preferably at 433 MHz for a non-limitative example, and provide adjustable detection ranges from a few inches to dozens of yards while providing a very high read rate, as it will be more clearly understood upon reading of the following description.

Figure 1:
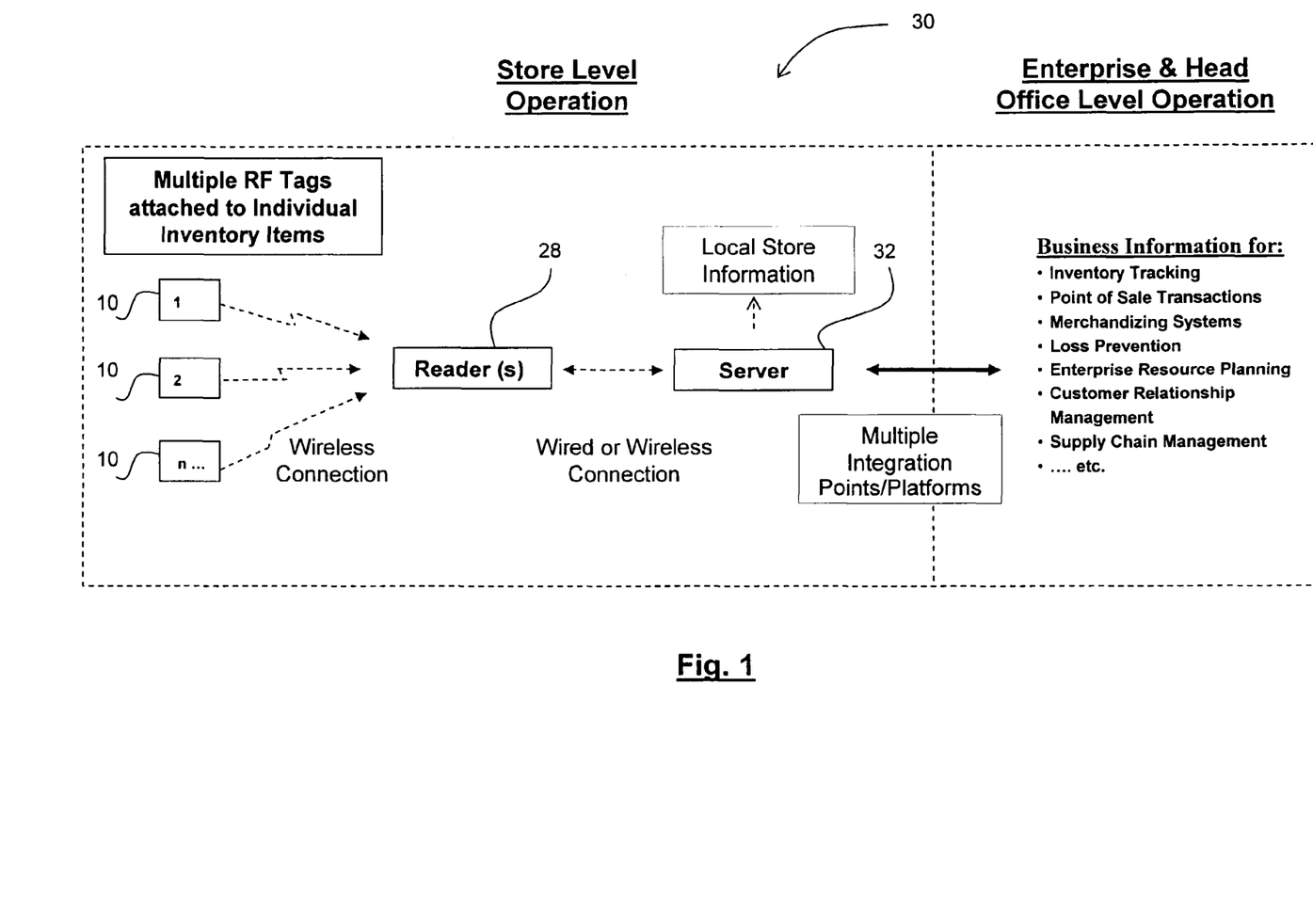
FIG. 1 is a schematic representation of an identification and surveillance system according to the present invention.
Figure 6:
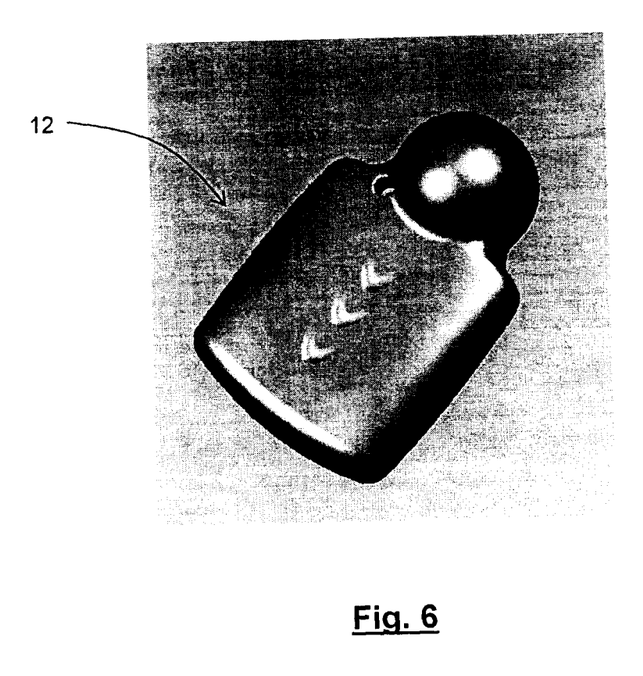
FIG. 6 shows a sample attaching device for attaching to an inventory item according to the invention.
Figure 7:
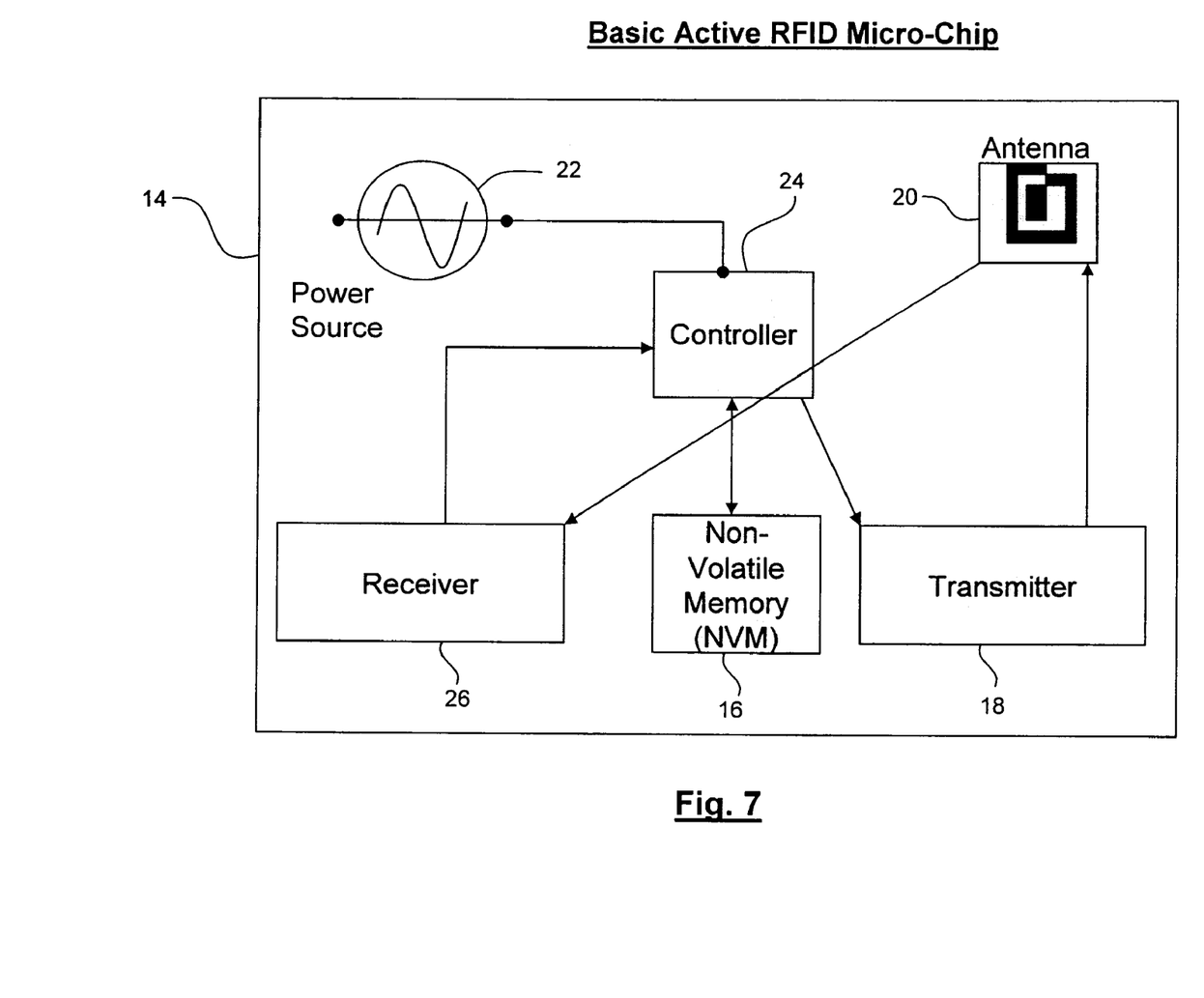
FIG. 7 illustrates a block diagram of a basic active RFID microchip according to the present invention.

Referring to FIGS. 1, 6 and 7, the present invention provides an identification and surveillance device 10 attachable to an individual inventory item (not shown) for tracking the item. The device 10 is provided with an attaching device 12 for attaching to the item and a radio-frequency device 14 securely mounted with or within the attaching device 12. The radio-frequency device 14 is provided with a storing means 16 for storing data therein, the data comprising individual tag-related information such as a unique pre-programmed identification code for tag identification purpose. The radio-frequency device 14 is also provided with a transmitter or transceiver 18, an antenna 20 and a power source 22, preferably a battery, for powering the device 14. As shown in FIG. 7, the radio-frequency device 14 may also be provided with a controller 24 for control thereof and a receiver 26. As illustrated, the storing means 16, which can advantageously be a non-volatile memory, the transmitter 18 the antenna 20 can be embedded in a single chip, with the controller 24 and the receiver 26.

Referring again to FIGS. 1 and 7, the radio-frequency device, with the help of the transmitter 18, is able to communicate with a corresponding radio-frequency receiver or reader 28 for tracking the item.

It is worth mentioning that the RF device 14, also called an inventory tag, is advantageously wireless, and bears no requirement for direct contact or line-of-sight communication with the reader 28.

Referring to FIG. 1, such an identification and surveillance device 10 is advantageously used in an identification and surveillance system 30 for independently tracking a plurality of individual inventory items (not shown). The system 30 has a plurality of identification and surveillance devices 10, each being attachable on a respective one of the plurality of items. The system 30 is also provided with a radio-frequency receiver or reader 28 capable of communicating wirelessly, advantageously with a nominal range of more than several yards per reader, with each of the radio-frequency devices 10 for receiving each of the corresponding data. The system 30 also comprises a software product suite along with application software, operating on a host computer/server 32, that is particularly adapted to read, process and store each piece of tag-related information of each corresponding set of data it receives, either via wire or wireless communication, from the RFID reader 28 in order to track each of the corresponding inventory items. The host computer/server 32 can advantageously be operatively connected, through the internet for example, to client enterprise systems, mobile appliances and other sites.

Figure 3:
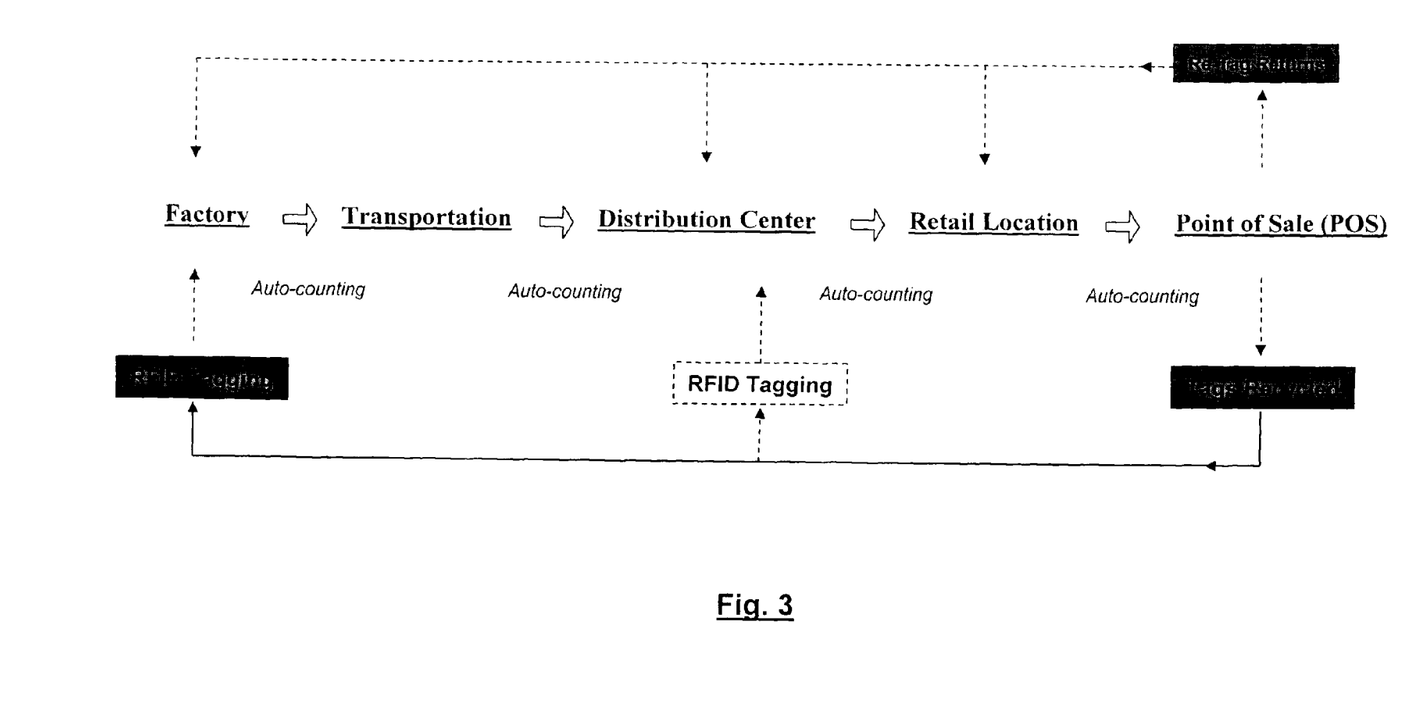
FIG. 3 shows the operational path of a reusable identification and surveillance device, according to the present invention.

As illustrated in FIG. 3, in one aspect, the RFID technology of the present invention is advantageously used to tag, identify and track individual inventory items as they move from the manufacturing floor through the supply chain and to the point of sale. As the inventory items move through the supply chain, long-range RFID readers can communicate with an RFID tag on the individual item, even when inside boxes and crates and without having to open them, to collect information about the item (each inventory tag having a unique identification number) and match that number in a database to access a complete record about the inventory item. This real-time technology advantageously provides unprecedented speed and accuracy in the supply chain.

As is known in the art, interest in RFID technology is driven by the desire of companies to achieve greater speed and visibility into their supply chains, while increasing both operational efficiency and store effectiveness. An efficient supply chain operation ensures that goods can be delivered to the place and at the time consumers are ready to purchase. Potential gains from the visibility RFID generates through the present invention include lower inventory levels, reduced labor costs, improved markdowns, increased sales, and consequently, increased profitability.

The long-range RF tags of the present invention advantageously replace magnetic strips and bar codes and are advantageously specifically designed for Individual Item-Level inventory management in addition to asset identification, real-time loss prevention, basic item location and other tracking applications. They are also specially designed to operate while mounted on all types of fabrics, metal surfaces, and plastics or fibreglass containing a high metallic content such as laptop and desktop computer systems, office machines, electronic appliances, hospital equipment, telephones, around fluids, etc. The system can also be advantageously configured to allow employees to be tracked, for them to be matched to individual laptops or assets, for drivers to correspond with specific vehicles or forklifts, for inventory to be authorized and controlled for storage locations, etc. Further, the system can also be used to enable the operation of said assets only when authorized personnel are within a prescribed proximity from said assets i.e. the assets can only be rendered operative when an authorized employee tag is within a prescribed proximity and, conversely, is rendered inoperative when the tag is outside of the prescribed proximity.

The system advantageously employs anti-collision algorithms embedded in a firmware of the radio-frequency device that allow multiple tags to be identified by a single reader at the same time. Moreover, in some cases, clients require delineated zones in order to locate inventory and/or set rules for entry, exit, alerts, etc. Thus, multiple readers can be linked to extend system range or to define specific identification zones within the system deployment.

It is worth mentioning that, in the given retail environment, it is generally more important to track moving inventory items than stationary items. Also, it is advantageous to increase the reader tag throughput and to increase the security of moving tags by decreasing the "time-out" value for moving tags. Accordingly, in one embodiment, the radio-frequency device is provided with a motion sensor for detecting motion of the inventory item while the radio-frequency device operates in a dual-transmission interval mode, a longer transmission interval detection when the item is stationary and a shorter transmission interval detection when the item is in motion. This dual transmission interval rate increases the battery life of the tag. Therefore when a tag is stationary, the time between transmissions is larger than when the tag is in motion. For example, if the throughput of a reader is 50 tags per second, the reader can consistently receive 50 tags transmitting at 1 second intervals or 500 tags transmitting at 10 second intervals. Also, the system can use intervals to set the "time-out" in order to change the status of the tag in the system software.

The product software suite is advantageously provided with an Application Programming Interface (API) to standardize the integration of different RFID hardware components with the system, and the integration of the identification and surveillance system itself with a retailer's merchandise inventory system and point-of-sale system.

With the system provided by the present invention, long range detection over dozens of yards can be achieved for each reader and, with the help of the anti-collision algorithms, specialized polling techniques and software, the system can then advantageously read, process and store thousands of tags in seconds, and do so on a continuous basis. This means that inventory does not have to be moved unduly close to readers and that entry/exit points do not have to be specially configured or tightly controlled to satisfy short read-ranges. It also implies dramatically less labour, installation complexity and, in limiting the number of receivers required, a reduced cost for the retailer.

For other systems in use today, notably those using passive RFID technology, the requirement for close distances between readers and tags has been acceptable, with limitation, on boxes, cases and pallets at tightly-controlled locations such as warehouses or distribution centers (so-called cooperative environments), but do not work effectively at the individual-item level for tracking inventory in most retail store environments, which are classically and particularly uncooperative to these kinds of operational limitations. Here entry/exit points are difficult to tightly control, store designs are more open, customer movement cannot be restrictive, individual inventory items need to be separately viewed and high passive reader costs. By design, the present invention does not have these limitations.

In a preferred embodiment of the identification and surveillance system of the present invention, the RFID tags are advantageously reused several times during several years, preferably at least two inventory turns per year, thereby dramatically reducing the associated ownership costs. Moreover, as previously mentioned, the RF tags of the present invention advantageously use specific high frequencies, such as 433 MHz for a non-limitative example, which can, in concert with the specialized techniques noted above, advantageously provide extremely high read-rates of the tags on a continuous basis. Furthermore, the system can be particularly devised to provide multiple access points for enterprise integration, remote access (such as internet or electronic appliances), as it will be more clearly described thereinafter.

As previously described, in the embodiment shown in FIG. 3, each tag has a pre-programmed identification code. Each inventory item of a particular set is advantageously assigned a specific SSKU (Short Stock Keeping Unit) number according to style, color, dimension, size or other characteristics of the particular set. Thus, each inventory item has a separate tag with a specific pre-programmed code and a correlating assigned SSKU number, which is all stored in the database on the application server. Thus, the store can be managed at the SSKU Level while the identification and surveillance system provides information at the individual item level.

It is well known that Specialty Retail, such as that including fashion apparel, is a completely different world compared to grocery retailing when it comes to inventory merchandising and for the most part of logistics. The vast majority of specialty retailers have a very small (if any) back store area where excess or replenishment inventory can be stored. Knowing what is on the selling floor and what is in the often overstuffed racks and shelving in the back store area create major difficulties for retailers as they work to ensure they are properly stocking their inventory and getting it to the selling floor. So these retailers need to be extremely accurate as to when, what and how much inventory to ship to stores. When inventory is received in the store, the staff must find the time as quickly as possible to get the newly-received merchandise on the selling floor so that customers can see and purchase the goods.

A core retail aspect addressed by the current invention is that today every transaction the retailer performs, such as receiving, inter-store transfers, sales, taking a physical inventory, distributions, replenishment, etc., contains a task of manually counting the inventory. An individual inventory unit can often be handled by human hands 6-8 times by the time it gets from the manufacturer to the store floor. Each time inventory is touched has the potential to cause damages that trigger a loss for the retailer.

Counting at the different stages in the supply chain is necessary in order for inventory merchandising systems, in-store systems and financial systems to properly reflect accurate inventory on-hands. Currently, human intervention in hand counts often leads to inaccurate inventory numbers. The proposed system eliminates the inaccuracy of hand counts, and therefore providing accurate merchandizing data to the retailer.

Figure 2:
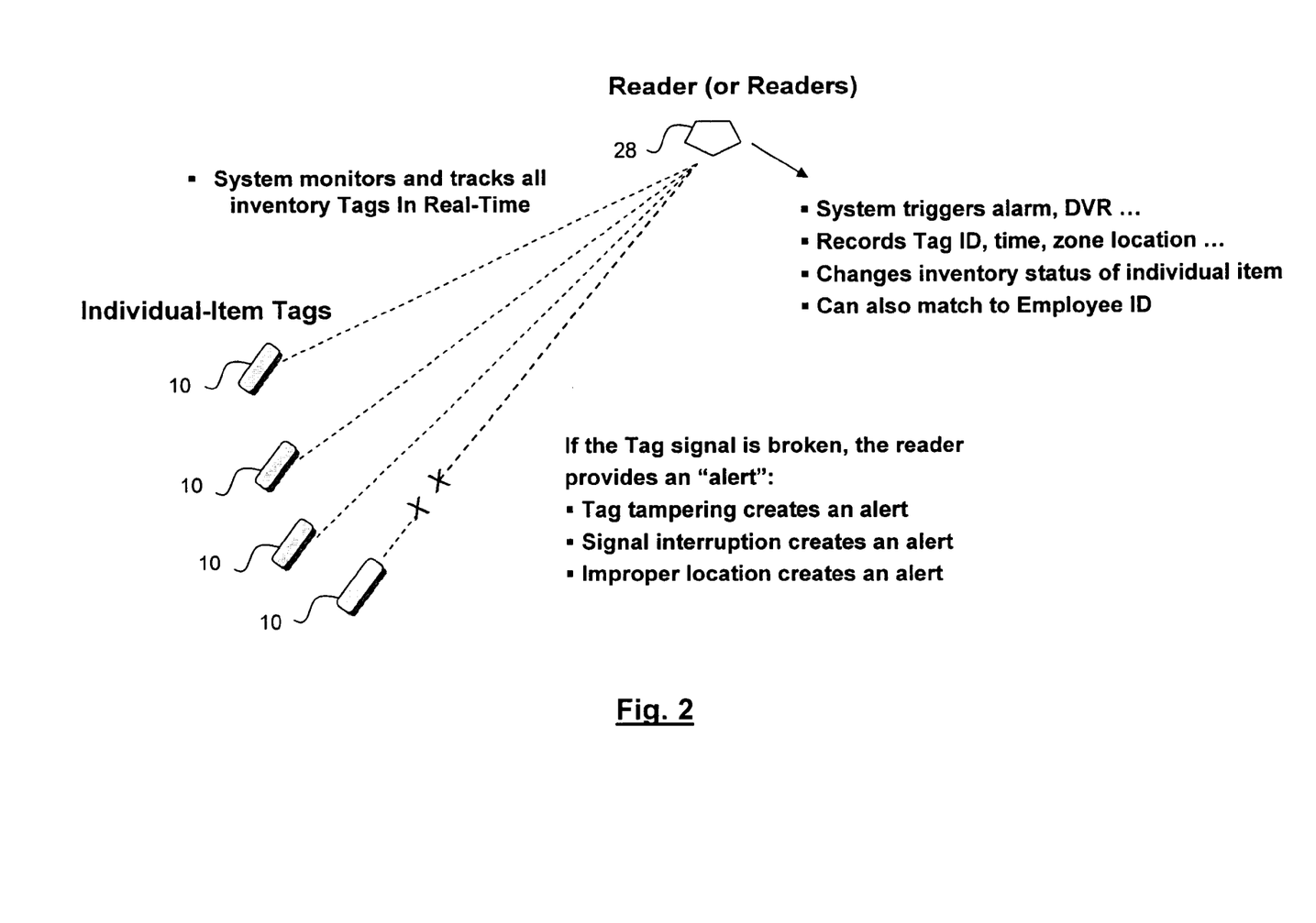
FIG. 2 shows the loss prevention feature which can be implemented according to the present invention.

A simple example is given below with reference to FIG. 2 for illustrating how today's inaccurate on-hand information can cause retailers to make recurring errors by trusting the data they believe to be accurate. No matter how expensive the installed inventory merchandising system, merchandise planning system, replenishment system or POS systems are, these errors create a domino effect causing losses in profitability for the retailer.

1. Measuring "Rate of Sale" or "% Sell Through"

All retailers use some form of measurement to determine the "sales velocity" of their merchandise. "Rate-of-sale" is used in this example. The example will produce the same results no matter which measurement formula is used. Thus the measurement formula $$\text{Weekly Rate of Sale} = \frac{\text{Sales units this week}}{\text{On-hand at beginning of week}}$$

will be used to determine fast sellers versus slow sellers.

For seasonal merchandise in Specialty Retail, the first six weeks are the most important. The retailer must determine quickly which styles are the fast sellers; potentially giving the retailer the capability of ordering more inventory of the fast sellers, or moving fast selling merchandise from slow selling stores into fast selling stores. At a given point, whether it is at six weeks or later, the retailer will then try to determine the least amount to discount the inventory so that sales begin to pick up again. This is repeated until the inventory is sold out.

The retailer will lose profitability if the merchandise is discounted too much or too soon, by losing the sales which would have sold at a higher price. The same is true if the inventory is left in slower selling stores instead of being transferred into stores which have proved that they could sell the same inventory at a higher price or at a faster velocity.

'System on-hand' below represents the current results with today's systems and 'Actual on-hand' represents the results which can advantageously be obtained with the system of the present invention.

First Distribution of a New Style in a New Season:
    Store 37 is shipped 10 units of:
    Style 1001 v-neck, color blue, size range: XS, S, M, L, XL
    QTY 1, 3, 3, 2, 1
    Assuming the store staff counts the receipt properly;
    Actual on-hand: 1, 3, 3, 2, 1=10
    System on-hand: 1, 3, 3, 2, 1=10
$1^{st}$ Week Transactions & Events:
    Shoplifters are successful in stealing 2 units;
    Actual on-hand: 1, 3, 2, 1, 1=8
    System on-hand: 1, 3, 3, 2, 1=10
    The store sells 2 units;
    Actual on-hand: 1, 2, 1, 1, 1=6
    System on-hand: 1, 2, 2, 2, 1=8
    The store finds 2 damaged units in dressing room;
    Actual on-hand: 1, 2, 0, 1, 0=4 (with 2 damaged units)
    System on-hand: 1, 2, 2, 2, 1=8
    Employee decides to grab the last large unit before the units are all gone;
    Actual on-hand: 1, 2, 0, 0, 0=3 (with 2 damaged units)
    System on-hand: 1, 2, 2, 2, 1=8
    Store sells 1 unit;
    Actual on-hand: 0, 2, 0, 0, 0=2 (with 2 damaged units)
    System on-hand: 0, 2, 2, 2, 1=7
End of $1^{st}$ Week: Weekly % Rate of Sale:
    Actual: 30%
    System: 30%
    Merchant review sees a good Rate of Sale, but sees only the 7 System on-hand units with current systems.
$2^{nd}$ Week Transactions & Events:
    Store sells 2 units;
        Actual on-hand: 0, 0, 0, 0, 0=0 (with 2 damaged units)
        System on-hand: 0, 0, 2, 2, 1=5
End of $2^{nd}$ Week: Weekly % Rate of Sale:
    Actual: 100% & Sold Out, with 2 damaged units
    System: 28% with 5 units on-hand
    Merchant review basically sees same Rate of Sale as in week 1.
$3^{rd}$ Week Transactions & Events:
    Actual on-hand: 0, 0, 0, 0, 0=0 (with 2 damaged units)
    System on-hand: 0, 0, 2, 2, 1=5
End of $3^{rd}$ Week:

Actual ROS=0%

System ROS=0%

Retailer review shows style has slowed down and in the next few weeks will become a losing product, be marked down a few times, but will never show any improvement whatsoever.

The retailer will eventually take a physical inventory sometime in January or June depending on the selling season. Weeks following the physical inventory, a retailer will notice the shrinkage and may possibly see the damaged units, depending on their policy for damaged goods. The general problem in retail is that the information is overly "lost in the noise" to be easily spotted.

With the use of the identification and surveillance system of the present invention, the retailer, with accurate and timely information in hand, would have moved more inventory into Store 37 in week 2 in an attempt to sell more units at full price/full margin. The Loss Prevention group would have been able to investigate Store 37 for the lost inventory. Employees would have been informed of the Company's ability to accurately detect theft. The two different scenarios therefore, one without the identification and surveillance system of the present invention and the other with the present invention, illustrate the huge problems retailers are faced with, even in this simplistic example.

2. Improved Vendor Analysis

The manufacturer of style 1001 would receive an incorrect picture based on the example given above. Correct analysis would have shown that this vendor had a popular high-selling style, and the issue of why the retailer ended up with 2 damaged units would have been flagged. Investigation as to whether it was poor quality or a case of negligence by the store staff or customer would have resulted. This is just one example but there are many other areas where accurate and timely measurements would benefit both the vendor and the retailer.

3. Missed Sales

Having a unique identification number for each inventory unit gives the retailer the capability to control inventory at the lowest possible level. The simple fact that merchants have poor visibility into their inventory creates situations where missed sales occur. As seen in the same example given above, missed sales occur when an item's inventory level is down to a level where customers have no selection whatsoever. Meanwhile, because of flawed information from the store, the retailer at Head Office sees an inventory picture that incorrectly points to a slow-selling product with units still on-hand. The retailer is actually dealing with missed sales of a potentially fast-selling product without even knowing it.

A missed sale is a very serious occurrence for the retailer. Every time a retailer has a customer walking into a store with the intention of buying, but leaves without making a purchase because the store did not have the merchandise they were shopping for, loses that customer in the worst possible way, at the same time creating a missed sale.

Another example of a missed sale situation is a customer requesting a transfer from a store which has the item, only to get a damaged unit.

The identification and surveillance system provided by the present invention provides a new solution in the marketplace which allows the retailer to control inventory with RFID tags at the item level. The system advantageously allows damaged inventory to be identified and accounted for.

4. Inter-Store Transfer

There are retailers who have inter-store transfer procedures whereby the merchandise being transferred is re-routed through the warehouse or Distribution Center (DC) to minimize transfer inventory count errors created by the store staff.

The identification and surveillance system of the present invention eliminates such inventory count errors by providing retailers with the capability to transfer store-to-store with complete confidence, eliminating all labor and transportation costs associated with the previous method of transferring merchandise. The merchandise also reaches the stores faster, not to mention that having merchandise on a truck or in a warehouse will also produce missed sales.

5. Increased Profits by Better Markdown Management

In the example given above a good retailer would start initiating a markdown program in the third or fourth week in order for Style 1001 to generate sales. The scenario with the present identification and surveillance system shows the opposite. Instead of initiating markdowns in this case, the correct action would have been to order additional inventory for the store. The profitability picture for Style 1001 is therefore dramatically different than what it could have been. With accurate and timely inventory information, retailers who implement the present identification and surveillance system will automatically benefit from better markdown management resulting in increased profits.

6. Automated Replenishment

An automated stock replenishment system is only as good as the information it uses. Based on the example above, there is no current replenishment system that would be accurate in sending additional inventory to Store 37. An automated stock replenishment system would immediately benefit from inventory accuracy provided by the system of the present invention, producing increased sales and profitability. The identification and surveillance system will also advantageously provide the retailer and the replenishment system with the ability to view style aging information of each of the tagged inventory items.

7. Substantial In-Store Labor Savings

In-store staff will no longer have to manually count merchandise for any process such as receipts, transfers in, transfers out, physical inventory taking and sales since the system will advantageously automatically count the inventory units for these transactions. The benefits are two fold. First, upon implementing the present system, the retailer advantageously has an immediate recurring savings in labor. Second, all of the hours eliminated are additional hours that could be applied to the selling floor to better serve customers.

As soon as the new merchandise has entered the store, the sales staff advantageously has on-line access to the information regarding what merchandise has just arrived, without the cartons being opened. Sales staff having this knowledge while serving customers would also eliminate a missed-sale scenario. Being capable of handling the receipt of merchandise faster will also expedite the time it currently takes to move the new merchandise from the carton to the selling floor.

Figure 4:
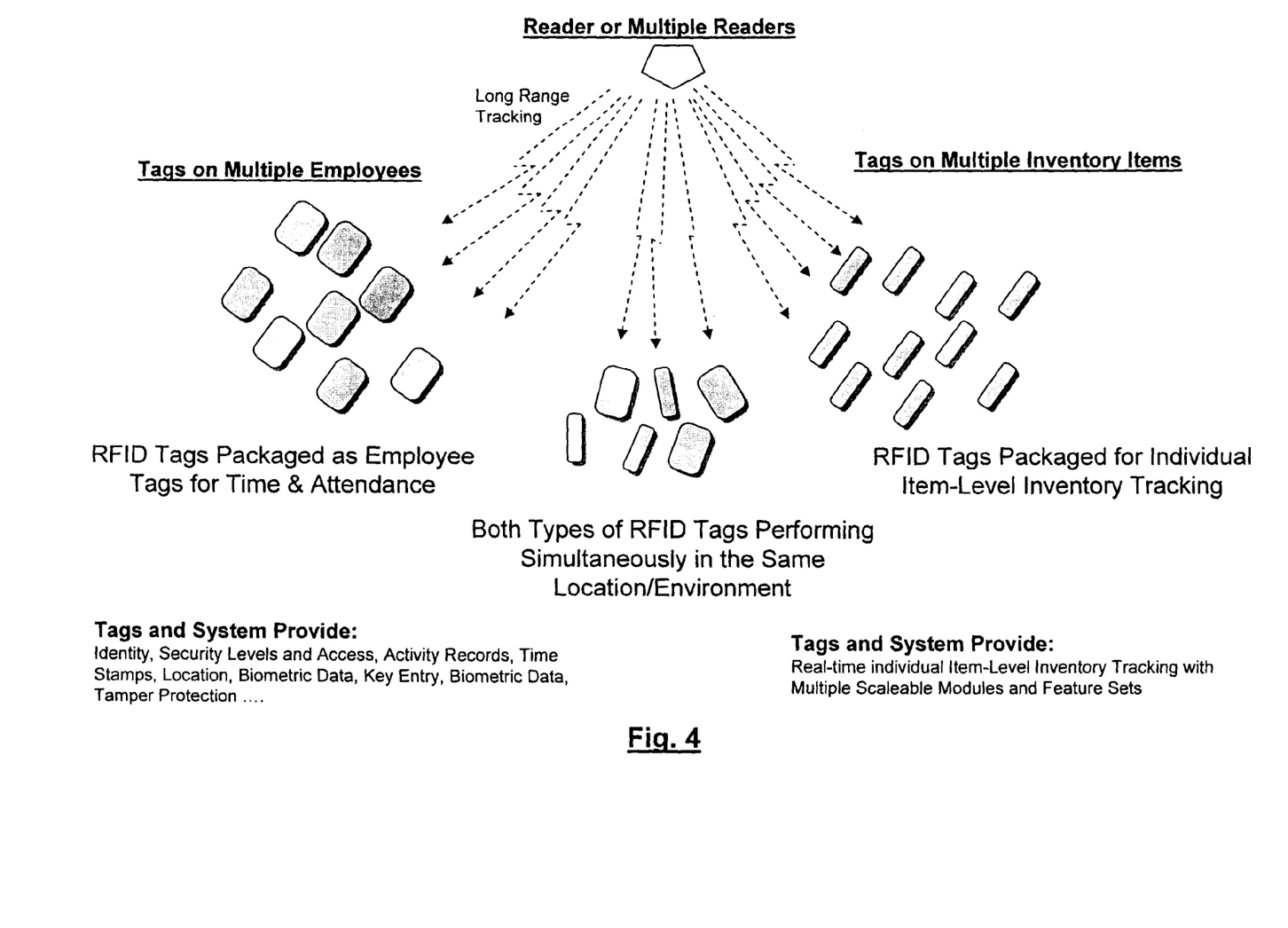
FIG. 4 illustrates a particular application of the system of the present invention for time and attendance surveillance.

8. Automated Time and Attendance:

Referring now to FIG. 4, the identification and surveillance system can also advantageously be provided with Employee RFID badges, each tracking a corresponding employee. The same in-store reader/receiver used for tracking inventory is used to track Employee RFID badges. With this particularly advantageous embodiment, time and attendance management can be done automatically, thereby eliminating all associated manual work to manage it.

In this embodiment, the system advantageously starts tracking a badge as soon as the employee enters the store and stops when an employee leaves the store. It automatically accumulates the time being worked and, once the store manager confirms the information collected, the information is sent to the integrated payroll system. Employee RFID badges advantageously have long ranges and are preferably provided with a "Tamper Detect" feature.

In a further embodiment, the system can also advantageously be configured with zones. With a separate reader in each zone, the system will report time spent within zones as well as the general time and attendance information. This data could advantageously be exported to any system using the embedded export tools provided in the identification and surveillance system of the present invention.

9. Loss Prevention

Referring again to FIG. 2, the system is advantageously able to provide accurate and immediate information for the Loss Prevention (LP) group in a retail operation. Moreover, as already mentioned, the software modules of the present system are advantageously remotely accessible by standard data communication means, or via internet for example, to a central location, depending on the implementation approach selected by the retailer. This preferred feature provides the LP group a means of accessing critical, accurate and timely information from the system regarding the current inventory levels and current inventory losses. The system can report a given day's inventory losses by prescribed intervals.

Provided the time & attendance option is implemented, the LP group can advantageously cross-reference the inventory losses to staff activity in the store at the time of the losses. All system information can be exported to other software packages that prepare custom reporting, create Executive Information Systems, Pattern Recognition Analysis Systems, exception and incident reporting tools, and others.

The identification and surveillance system of the present invention can also address that part of Loss Prevention that includes protection from, and the prosecution of, shoplifters. By implementing specialized reader configurations for zoning, the system can provide surveillance and alerts at store exit points and in the fitting rooms. As also noted previously, the system can integrate with Digital Video Recorders (DVRs) to produce video records of such incidents referring to time stamps, item-specific information, zone information and so on. As such, and unlike EAS systems, the identification and surveillance system of the present invention can provide information well beyond the fact that an item has illegally left the store. Rather, the system advises the retailer and Loss Prevention Group exactly what item has left inventory, what time it left, when a tag has been tampered with, in what zone the incident has taken place, a video record of the perpetrator (if integrated with DVRs) and (if integrated with a Time and Attendance module) a record of employee location at the time of the incident.

10. Physical Inventory Count Process

Typically, specialty retailers take two full physical inventory counts per year plus several cyclical inventory counts during the year for departments or for classes of merchandise that prove to be problematic. These inventory counts are very expensive and very time consuming to undertake. Many retailers use outside service providers to take the full inventory counts and most use their own staff to take the cyclical counts. Prior to taking an inventory count, all movement of merchandise being counted is required to be frozen in a physical location in order to be counted. Therefore, the retailer must ensure that no distributions or transfers are initiated by the head office or at the store level. The timing is required to be perfect, otherwise the whole physical inventory may be jeopardized and have to be re-started.

In using the identification and surveillance system of the present invention, retailers will have the capability to take physical inventory counts as often as they want. The count scan can be pre-scheduled and can then be automatically taken in the stores and warehouse/DC, with no human intervention.

11. Speed at Point of Sale

In using the identification and surveillance system of the present invention, at the Point of Sale (POS), the merchandise can be automatically scanned instantly, no longer needing line-of-sight for the bar code reader to scan the bar code, thereby reducing check out lines at peak times.

12. Point of Sale Security

In a further preferred embodiment, the identification and surveillance system can also be provided with a security module that allows only authorized Employee RFID badges to operate the POS system. Once an authorized badge moves outside the retailer's pre-determined range, the POS terminal locks down and can not be used until an authorized badge returns within its range. With this module, retailers no longer need to worry about a store's staff sharing confidential passwords. The LP group could now depend on POS Transaction logs that identify transactions by staff.

13. Other Benefits

As already mentioned, it is important to note that the RF identification and surveillance devices of the present invention are advantageously reusable tags with a life span of up to five years, which contributes to minimizing the total cost of ownership to the retailer.

Figure 5:
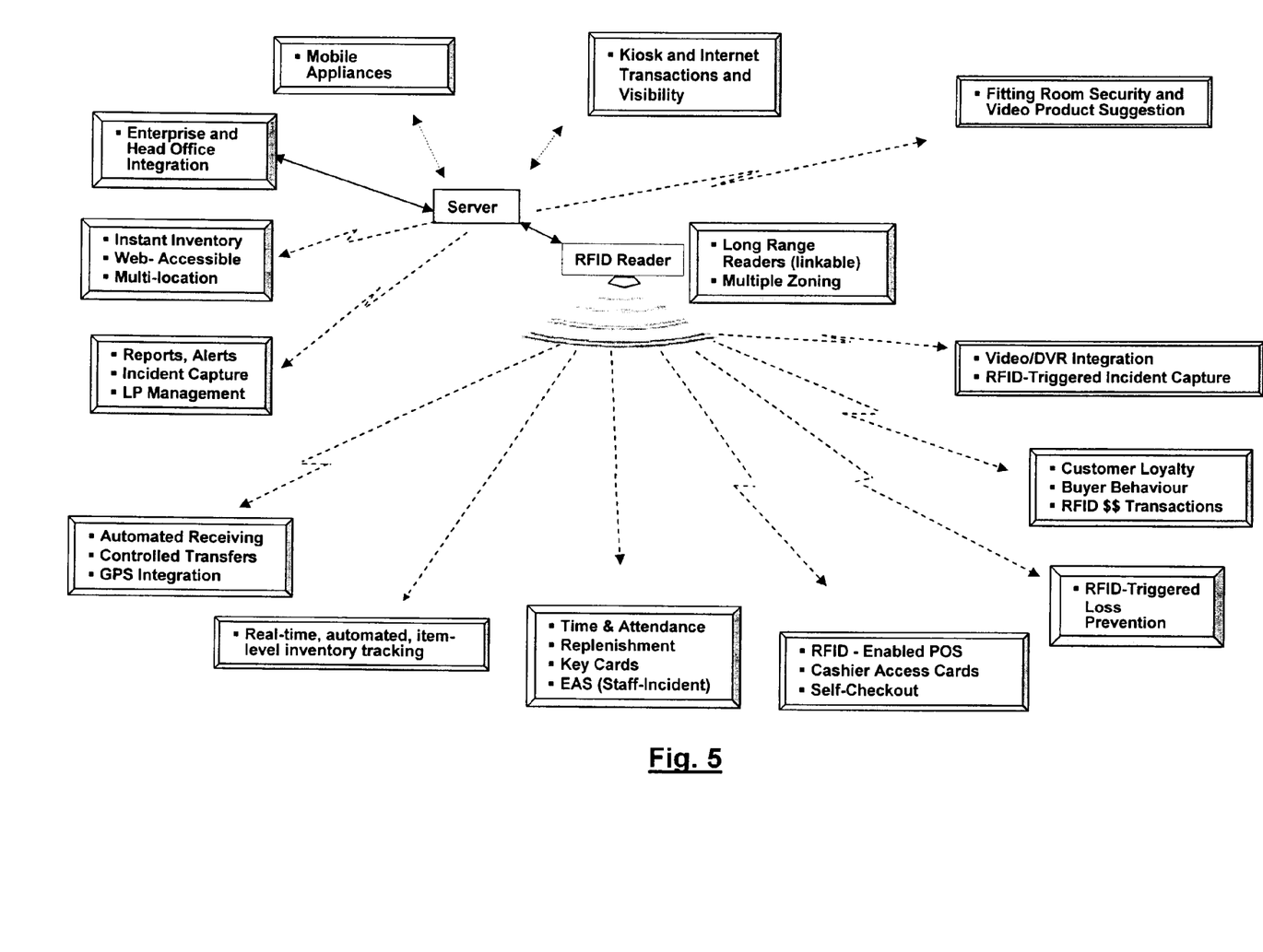
FIG. 5 illustrates an overall identification and tracking system according to the present invention.

As well illustrated in FIG. 5, the identification and surveillance system of the present invention is modular and highly scalable so that numerous advantageous features can be easily implemented.

Moreover, in providing the foregoing important benefits and features, the implementation of the system, advantageously provides both tangible and intangible benefits, summarized below:

Tangible Benefits
   Automated Physical Inventory
   Basic Item Location
   Complete Control Over Loss Prevention
   Reduced Out-of-Stocks
   Reduced Shrinkage
   Automated Store Receiving
Intangible Benefits
   Increased Employee Productivity
   Control Over Store Transfers
   Automated Markdown Counts
   Warehouse Receiving
   Control over Style Aging
   Control over Layaway, Display & Damaged Inventory
   Automated Time & Attendance As previously mentioned, according to another aspect of the invention, there is also provided an identification and surveillance method for independently tracking a plurality of individual inventory items. The method comprises the steps of:

a) providing a plurality of identification and surveillance devices, each comprising:
    an attaching device for attaching to a corresponding item; and
    a radio-frequency device securely mounted with the attaching device, the radio-frequency device comprising:
      storing means for storing data therein, the data comprising individual tag-related information;
      a transmitter;
      an antenna; and
      a power source for powering the device;

wherein said radio-frequency device, with the help of the transmitter, is able to communicate with a corresponding radio-frequency receiver for tracking the item;

b) attaching each of the identification and surveillance devices to a respective one of the inventory items;

c) providing a software product suite with application software loaded into a host computer and adapted to read, process and store each of the data with the help of a radio-frequency receiver for tracking each of the corresponding items; and d) tracking each of the inventory items.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. An identification and surveillance device attachable to an individual inventory item for tracking said item, said device comprising:
   an attaching device for attaching to said item; and
   an active radio-frequency device securely mounted with said attaching device, said radio-frequency device comprising:
   storing means for storing data therein, said data comprising individual tag-related information;
   a transmitter;
   an antenna; and
   a power source for powering said active radio-frequency device;
   wherein said active radio-frequency device, with the help of said transmitter, is able to communicate with a corresponding radio-frequency receiver for tracking said item and for providing loss prevention information in response to a potential loss event without requiring an interrogating signal, said loss prevention information including a time stamp, and
   wherein said attaching device and said active radio-frequency device are reusable.

2. The device according to claim 1, wherein the storing means and the transmitter are embedded on a PC board.

3. The device according to claim 2, wherein the antenna is embedded on the PC board.

4. The device according to claim 1, wherein said power source is a battery.

5. The device according to claim 1, wherein said radio-frequency device comprises an active chip operatively connected to the power source and a passive chip.

6. The device according to claim 1, wherein said radio-frequency device comprises a motion sensor for detecting motion of the inventory item, the radio-frequency device operating in a dual-transmission interval mode, a longer transmission interval detection when the item is stationary and a shorter transmission interval detection when the item is in motion.

7. The device according to claim 1, wherein said identification and surveillance device further comprises a global positioning system embedded therein.

8. The device according to claim 1, wherein said tag-related information comprises a unique pre-programmed identification code.

9. The device according to claim 1, wherein said radio-frequency device communicates with the corresponding receiver in a frequency range between Low Frequency and Micro Frequency, within approved radio spectrum frequency allocations.

10. The device according to claim 1, wherein said radio-frequency device communicates with the corresponding receiver at a frequency of 433 MHz.

11. The device according to claim 1, wherein said attaching device is provided with an anti-tamper and an anti-theft mechanism.

12. An identification and surveillance system for independently tracking a plurality of individual inventory items, said system comprising:
   a plurality of identification and surveillance devices, each of said devices being attachable to a respective one of said plurality of items and comprising:
   an attaching device for attaching to a corresponding item; and
   an active radio-frequency device securely mounted with said attaching device, said radio-frequency device comprising:
   storing means for storing data therein, said data comprising individual tag-related information;
   a transmitter;
   an antenna; and
   a power source for powering said active radio-frequency device;
   wherein each radio-frequency device, with the help of its transmitter, is able to communicate with a corresponding radio-frequency receiver for tracking one of said items and for providing loss prevention information in response to a potential loss event without requiring an interrogating signal, said loss prevention information including a time stamp, and wherein each attaching device and its active radio-frequency device are reusable;
   a radio-frequency receiver capable of communicating with each of said active radio-frequency devices for receiving each of said corresponding data; and
   a software product suite with application software loaded into a host computer and adapted to read, process and store each of said data with the help of said radio-frequency receiver for tracking each of said corresponding inventory items.

13. The system according to claim 12, wherein the radio-frequency device comprises a firmware provided with an anti-collision algorithm for allowing identification of a plurality of identification and surveillance devices by the radio-frequency receiver at the same time.

14. The system according to claim 12, the system being implemented in a retail store environment.

15. The system according to claim 14, the system providing an automated physical inventory of said retail store environment.

16. The system according to claim 14, further comprising additional radio-frequency receivers distributed in said retail store environment for tracking a presence of each of the radio-frequency devices.

17. The system according to claim 14, wherein the retail store environment comprises a plurality of distinct zones, the system further comprising additional radio-frequency receivers distributed in said zones for providing zoning information and for tracking a presence of each of said radio-frequency devices.

18. The system according to claim 14, further comprising video recorders operatively connected to the application software for improving surveillance of the inventory items.

19. The system according to claim 14, wherein the software product suite comprises an interface module for interfacing with an electronic article surveillance system.

20. The system according to claim 14, further comprising a plurality of employee identification and surveillance devices, each of said devices being assigned to and attachable to a corresponding employee for tracking each of a plurality of employees within the retail store environment.

21. The system according to claim 14, further comprising a point of sale module for preventing access to the point of sale to an unauthorised user.

22. An identification and surveillance method for independently tracking a plurality of individual inventory items, said method comprising the steps of:
   a) providing a plurality of identification and surveillance devices, each comprising:
      an attaching device for attaching to a corresponding item; and
      an active radio-frequency device securely mounted with said attaching device, said radio-frequency device comprising:
      storing means for storing data therein, said data comprising individual tag-related information;
      a transmitter;
      an antenna; and
      a power source for powering said active radio-frequency device;
      wherein each radio-frequency device, with the help of its transmitter, is able to communicate with a corresponding radio-frequency receiver for tracking one of said items and for providing loss prevention information in response to a potential loss event without requiring an interrogating signal, said loss prevention information including a time stamp, and wherein each attaching device and its active radio-frequency device are reusable;
   b) attaching each of said identification and surveillance devices to a respective one of said inventory items;
   c) providing a software product suite with application software loaded into a host computer and adapted to read, process and store each of said data with the help of a radio-frequency receiver for tracking each of said corresponding items; and
   d) tracking each of said inventory items.

23. The method according to claim 22, wherein said step b) is performed during a manufacturing process of said inventory items, and wherein said step d) is performed until a sale of the corresponding inventory item occurs at a point of sale.

24. The method according to claim 23, further comprising a step of: detaching one of said identification and surveillance devices off the corresponding inventory item once sold.

25. The method according to claim 22, wherein said step d) is performed in real time for providing an automated physical inventory of said items in real time.

* * * * *